(12) United States Patent
Yekutiely et al.

(10) Patent No.: US 6,213,859 B1
(45) Date of Patent: Apr. 10, 2001

(54) ANCHOR BOLT DRILLING TOOL

(76) Inventors: David Yekutiely, 24 Sheshet Hayamim Street, Ramat Hasharon 47247 (IL); Barak Yekutiely, 3308 Middlefield Rd., Palo Alto, CA (US) 94310

( * ) Notice: Subject to any disclaimer, the term of this patent is extended or adjusted under 35 U.S.C. 154(b) by 0 days.

(21) Appl. No.: 09/510,070

(22) Filed: Feb. 22, 2000

(51) Int. Cl.⁷ .............................. B23F 21/03; B23F 21/23
(52) U.S. Cl. .............................................. 451/541; 451/540
(58) Field of Search .................... 411/29, 30, 31, 411/50, 51, 53, 54, 57, 60, 55, 75, 76, 77–80, 82; 405/259, 260, 261; 61/45 B, 39, 63; 175/226, 315; 85/51, 64; 451/541, 540, 542, 547

(56) References Cited

U.S. PATENT DOCUMENTS

| | | | |
|---|---|---|---|
| 4,055,051 | * | 10/1977 | Finney ............................ 61/45 B |
| 4,518,290 | * | 5/1985 | Frichamann et al. .................. 411/30 |

* cited by examiner

*Primary Examiner*—Derris H. Banks
(74) *Attorney, Agent, or Firm*—Hoffman, Wasson & Gitler

(57) ABSTRACT

A drilling tool including a shank having a chuck end adapted for being held in a chuck of a drill, and an opposite, bifurcated end formed with a bore, the bifurcated end including two portions separated from each other by a gap, an abrasive annulus formed at least partially around the bifurcated end, and a wedge member slidingly disposed in the bore, the wedge member operative to push the two portions away from each other when moved towards the chuck end.

8 Claims, 4 Drawing Sheets

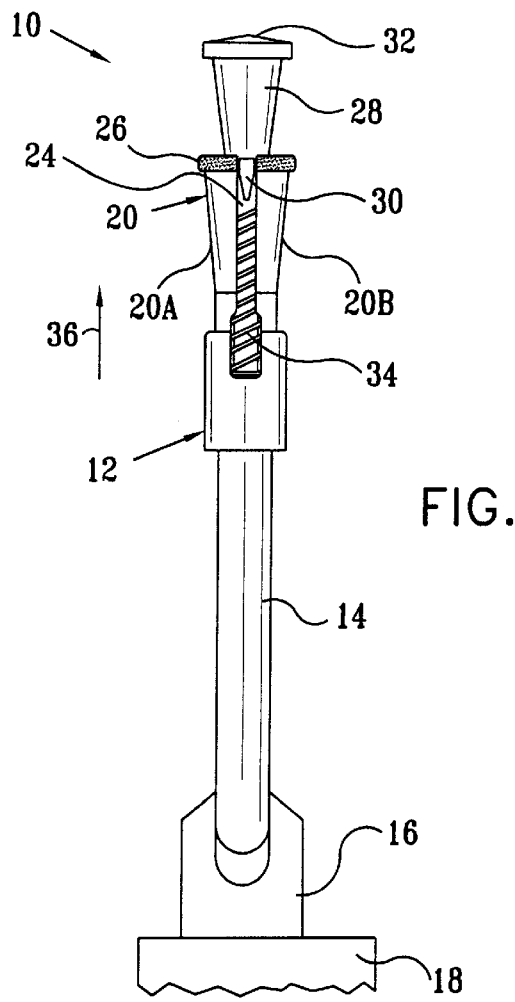
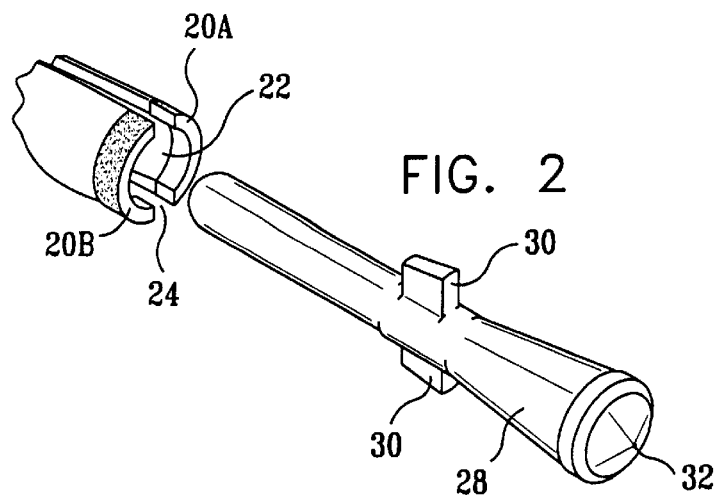

ent invention the wedge member includes a gener-
ANCHOR BOLT DRILLING TOOL

FIELD OF THE INVENTION

The present invention relates generally to drilling tools, and particularly to a tool for drilling holes for anchor bolts.

BACKGROUND OF THE INVENTION

Anchor bolts, sometimes also referred to as expansion bolts, the terms being used interchangeably herein, are bolts that have a threaded shank whose tip is fashioned to expand outwards when screwed into a hole. By torquing the anchor bolt sufficiently, the expanded end grips the inner circumference of the hole strongly enough to anchor even heavy objects to a wall or ceiling.

In general, the anchor bolt is simply inserted in a hole whose diameter is slightly larger than the nominal diameter of the anchor bolt shank. The anchor bolt is tightened and expands, thereby gripping the hole.

SUMMARY OF THE INVENTION

The present invention seeks to provide a novel tool for drilling holes for anchor bolts. The tool includes a shank with a bifurcated end formed with a bore, the bifurcated end being formed with an abrasive annulus. The abrasive annulus can serve as a regular drill. A wedge member is inserted in the bore of the shank, and can push apart the bifurcated end when pressed or pushed into the bore of the shank.

The tool prepares a hole for an anchor bolt in the following manner: First, a regular hole is drilled in a wall or ceiling. The drilling tool of the present invention is then inserted in the drilled hole, with the wedge member inserted in the bore of the shank. The wedge member preferably has a conical tip that abuts against the end of the hole, thereby distancing the abrasive annulus from the end of the hole. The drilling tool is then pushed to press the wedge member into the bore of the shank, thereby spreading out the bifurcated end of the shank. The result is that the abrasive annulus drills a counterbore in the wall or ceiling of a larger diameter than the initial, regular hole. During drilling, the conical tip of the wedge member bears against the end of the hole, with the drilling tool rotating about the center of the tip. Thus, the tip acts as a centering support for the drilling tool.

After drilling the counterbore, an anchor bolt of any kind, plastic or metal, can be inserted in the hole. The anchor bolt will now expand not against the regular hole, but rather against the counterbore, meaning that the anchor bolt is expanding against a larger area, thereby forming a stronger fastened connection. It is important to note that because the anchor bolt expands against the counterbore instead of the regular, straight hole, the torque required to expand the anchor bolt is less than that required heretofore in the prior art, and yet the strength of the fastened connection is significantly greater.

It is noted that the drilling tool of the present invention can be manufactured in a variety of sizes and lengths, and can span a multiplicity of diameters, from small to large. The drilling tool can drill any material, such as concrete, brick, masonry, stone (e.g., marble), glass or wood, for example.

There is thus provided in accordance with a preferred embodiment of the present invention a drilling tool including a shank having a chuck end adapted for being held in a chuck of a drill, and an opposite, bifurcated end formed with a bore, the bifurcated end including two portions separated from each other by a gap, an abrasive annulus formed at least partially around the bifurcated end, and a wedge member slidingly disposed in the bore, the wedge member operative to push the two portions away from each other when moved towards the chuck end.

In accordance with a preferred embodiment of the present invention the wedge member includes a tenon that extends outwards from the wedge member, the tenon being received in the gap and guiding the wedge member during sliding travel in the bore.

Further in accordance with a preferred embodiment of the present invention a biasing device is inserted in the bore that urges the wedge member in a direction generally away from the chuck end.

Still further in accordance with a preferred embodiment of the present invention the wedge member includes a generally conical tip pointing away from the chuck end.

Additionally in accordance with a preferred embodiment of the present invention the bifurcated end extends generally conically outwards beyond a diameter of the chuck end.

In accordance with a preferred embodiment of the present invention the wedge member is bifurcated and formed with a bore, the bifurcated wedge member including two portions separated from each other by a gap, an abrasive annulus being formed at least partially around the bifurcated wedge member, wherein an additional wedge member is slidingly disposed in the bore of the first-mentioned wedge member, the additional wedge member being operative to push the two portions of the first-mentioned wedge member away from each other when pushed towards the chuck end.

Further in accordance with a preferred embodiment of the present invention the abrasive annulus is formed at a tip of the bifurcated end. Preferably the abrasive annulus is constructed of a diamond coating.

BRIEF DESCRIPTION OF THE DRAWINGS

The present invention will be understood and appreciated more fully from the following detailed description, taken in conjunction with the drawings in which:

FIG. 1 is a simplified pictorial illustration of a drilling tool constructed and operative in accordance with a preferred embodiment of the present invention;

FIG. 2 is a simplified exploded illustration of a portion of the drilling tool of FIG. 1;

FIGS. 3A–3E are simplified pictorial illustrations of using the drilling tool of FIG. 1 to drill a hole for an anchor bolt, in accordance with a preferred embodiment of the present invention, wherein FIG. 3A illustrates drilling an initial hole in a wall or ceiling, FIG. 3B illustrates inserting the drilling tool of FIG. 1 in the initial hole, FIG. 3C illustrates drilling a counterbore with the drilling tool of FIG. 1, FIG. 3D illustrates inserting an anchor bolt in the drilled hole, and FIG. 3E illustrates an object clamped to the wall or ceiling with an anchor bolt;

DETAILED DESCRIPTION OF A PREFERRED EMBODIMENT

Figure 3A:
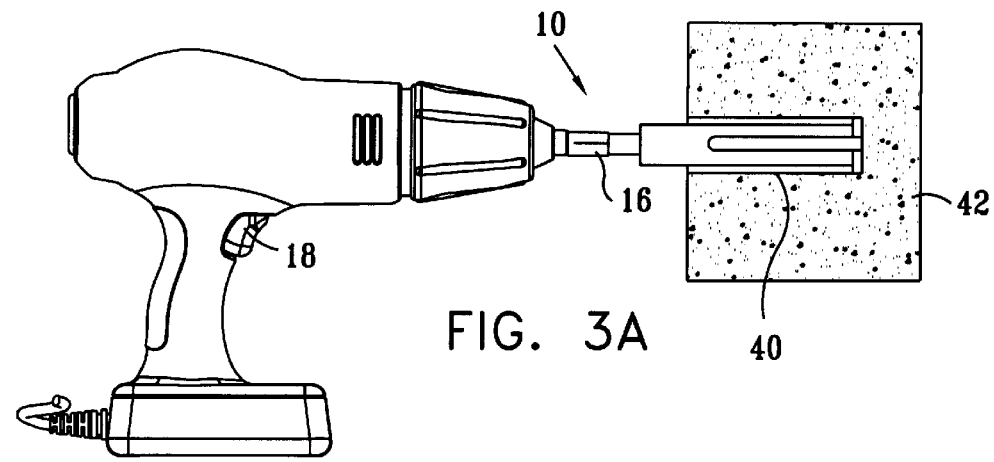

Reference is now made to FIGS. 1 and 2 which illustrate a drilling tool 10 constructed and operative in accordance with a preferred embodiment of the present invention.

Drilling tool 10 preferably includes a shank 12 having a chuck end 14 adapted for being held in a chuck 16 of a drill 18. Shank 12 has an opposite, bifurcated end 20 formed with a bore 22. Bifurcated end 20 includes two portions 20A and 20B separated from each other by a gap 24. An abrasive annulus 26 is preferably formed at least partially around bifurcated end 20, most preferably at a tip of bifurcated end 20. Abrasive annulus 26 is preferably constructed of a diamond coating. Bifurcated end 20 preferably extends generally conically outwards beyond a diameter of chuck end 14.

A wedge member 28 is preferably slidingly disposed in bore 22. Wedge member 28 preferably includes one or more tenons 30 that extend outwards from wedge member 28. Each tenon 30 is preferably received in gap 24 and guides wedge member 28 during sliding travel in bore 22. Wedge member 28 preferably includes a generally conical tip 32 pointing away from chuck end 14. Wedge member 28 pushes the two portions 20A and 20B of bifurcated end 20 away from each other when moved towards chuck end 14. A biasing device 34, such as a coil spring, is preferably inserted in bore 22 and fits around an end of wedge member 28. Biasing device 34 urges wedge member 28 in a direction of an arrow 36, generally away from chuck end 14.

It is noted that drilling tool 10 can be manufactured in a variety of sizes and lengths, and can span a multiplicity of diameters, from small to large. Drilling tool 10 can drill any material, such as concrete, brick, masonry, stone (e.g., marble), glass or wood, for example. Drilling tool 10 can be manufactured to have different lifetimes, depending, inter alia, on the type of material used to construct abrasive annulus 26. For example, the quality of the diamond coating can determine the lifetime. Drilling tool 10 can be used or integrated with any existing drill.

Reference is now made to FIGS. 3A–3E which illustrate using drilling tool 10 to drill a hole for an anchor bolt, in accordance with a preferred embodiment of the present invention.

In FIG. 3A, an initial hole 40 is drilled in a wall or ceiling 42. A standard drill can be used to drill hole 40. Alternatively, drilling tool 10 itself can be used to drill hole 40, with wedge member 28 removed.

Figure 3B:
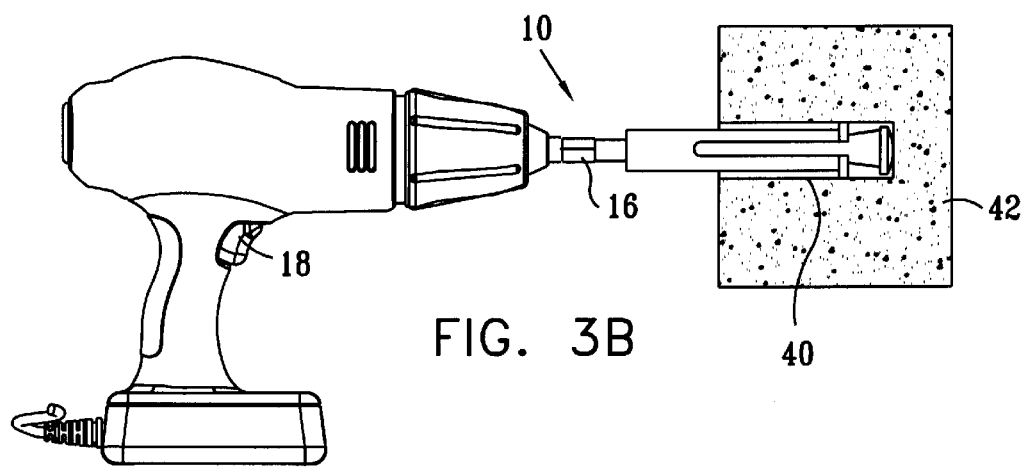

In FIG. 3B, drilling tool 10 with wedge member 28 inserted in bore 22, is inserted in hole 40. Note that the conical tip 32 of wedge member 28 abuts against the end of hole 40, thereby distancing abrasive annulus 26 from the end of hole 40.

Figure 3C:
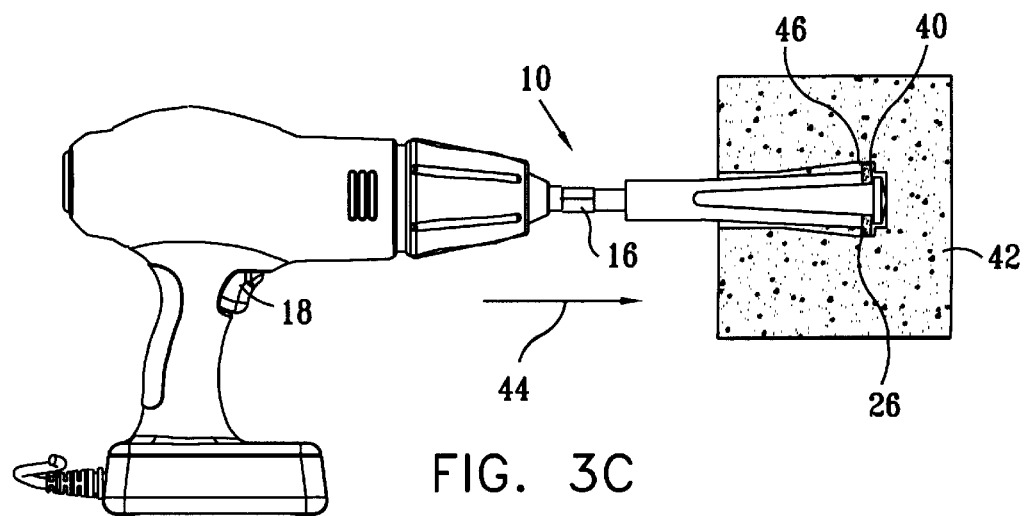

In FIG. 3C, drill 18 is pushed generally in the direction of an arrow 44 towards the tip 32 of wedge member 28. This compresses biasing device 34 and makes wedge member 28 push the two portions 20A and 20B of bifurcated end 20 away from each other. The result is that abrasive annulus 26 drills a counterbore 46 in wall or ceiling 42 of larger diameter than hole 40. During drilling, conical tip 32 of wedge member 28 bears against the end of hole 40, with drilling tool 10 rotating about the center of tip 32. Thus, tip 32 acts as a centering support for drilling tool 10. After drilling, drill 18 is no longer pushed in the direction of arrow 44. In the absence of the pushing force, portions 20A and 20B spring back towards each other, and drilling tool 10 can be easily removed from hole 40.

Figure 3D:
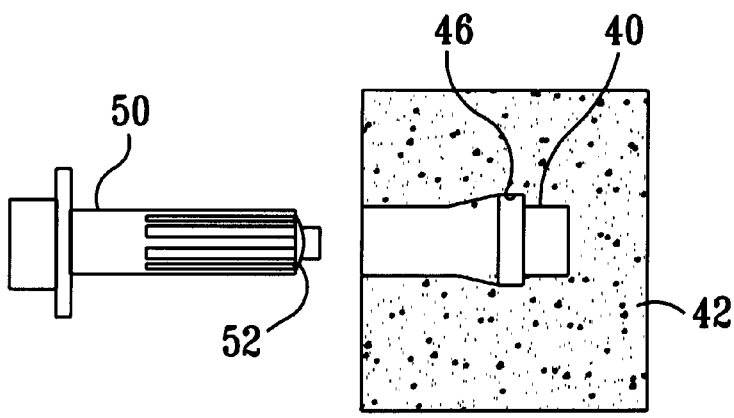

In FIG. 3D, an anchor bolt 50 of any kind, plastic or metal, can be inserted in hole 40.

Figure 3E:
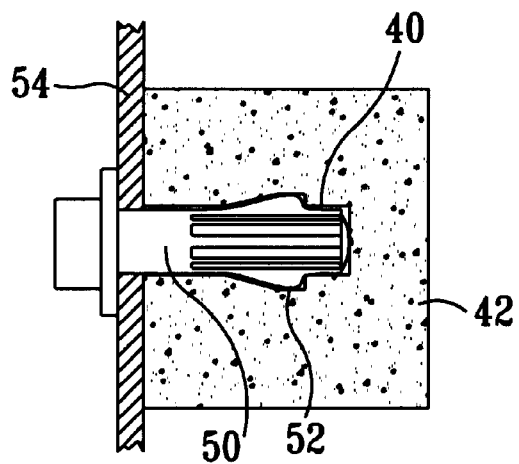

In FIG. 3E, anchor bolt 50 is tightened so that an expandable tip 52 expands against the inner surfaces of counterbore 46. In this manner, anchor bolt 50 clamps an object 54 to wall or ceiling 42. Any kind of anchor bolt can be used with the hole and counterbore prepared by drilling tool 10. It is important to note that because the anchor bolt expands against counterbore 46 instead of against a regular, straight hole, the torque required to expand the anchor bolt is less than that required heretofore in the prior art, and yet the strength of the fastened connection is significantly greater.

Figure 4:
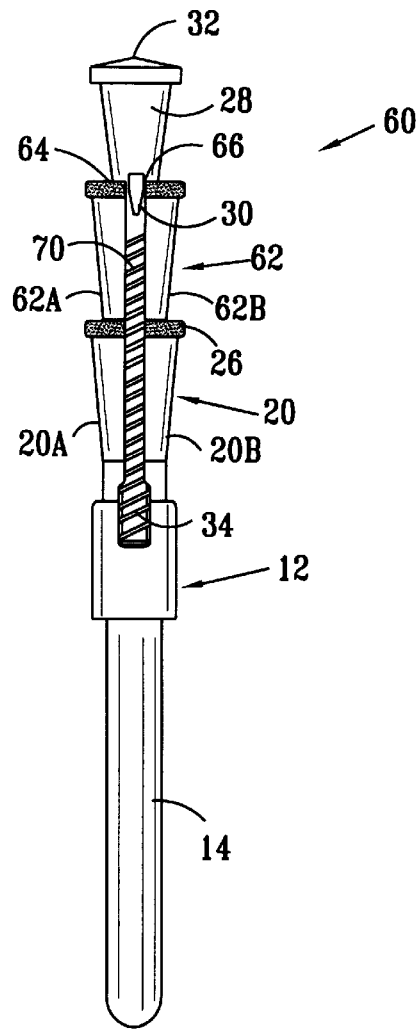
FIG. 4 is a simplified pictorial illustration of a drilling tool with multiple wedge members, constructed and operative in accordance with a preferred embodiment of the present invention.

Reference is now made to FIG. 4 which illustrates a drilling tool 60 constructed and operative in accordance with a preferred embodiment of the present invention. Drilling tool 60 is preferably constructed similarly to drilling tool 10, with like elements being designated by like numerals. Drilling tool 60 preferably includes a wedge member 62 formed like wedge member 28, but bifurcated and formed with a bore 64. Bifurcated wedge member 62 includes two portions 62A and 62B separated from each other by a gap 66. An abrasive annulus 68 is preferably formed at least partially around bifurcated wedge member 62. Wedge member 28 is slidingly disposed in bore 64 of wedge member 62. Wedge member 28 pushes portions 62A and 62B away from each other when pushed towards chuck end 14. A biasing device 70, such as a coil spring, is preferably inserted in bore 64 and fits around an end of wedge member 28. Biasing device 34 preferably fits around the end of wedge member 62.

Figure 5:
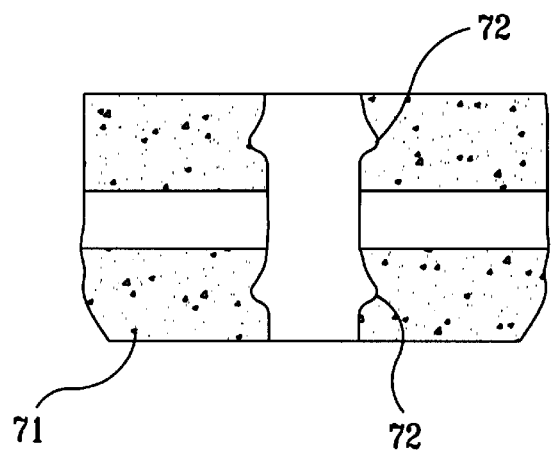
FIG. 5 is a simplified pictorial illustration of a hole with multiple counterbores drilled with the drilling tool of FIG. 4.

Drilling tool 60 is used similarly to drilling tool 10. When a drill (not shown) carrying drill tool 60 is pushed against a wall or ceiling, both wedge members 28 and 62 expand outwards to drill a pair of spaced counterbores. Reference is now made to FIG. 5 which illustrates a hollow building block 71 with a pair of spaced counterbores 72 formed therein with drilling tool 60. Thus, the present invention provides the possibility of drilling multiple counterbores for superior strength and holding power.

It will be appreciated by persons skilled in the art that the present invention is not limited by what has been particularly shown and described hereinabove. Rather the scope of the present invention includes both combinations and sub-combinations of the features described hereinabove as well as modifications and variations thereof which would occur to a person of skill in the art upon reading the foregoing description and which are not in the prior art.

What is claimed is:

1. A drilling tool comprising:
   a shank having a chuck end adapted for being held in a chuck of a drill, and an opposite, bifurcated end formed with a bore, said bifurcated end comprising two portions separated from each other by a gap;
   an abrasive annulus formed at least partially around said bifurcated end; and
   a wedge member slidingly disposed in said bore, said wedge member operative to push the two portions away from each other when moved towards said chuck end.

2. The drilling tool according to claim 1 wherein said wedge member comprises a tenon that extends outwards from said wedge member, said tenon being received in said gap and guiding said wedge member during sliding travel in said bore.

3. The drilling tool according to claim 1 and further comprising a biasing device inserted in said bore that urges said wedge member in a direction generally away from said chuck end.

4. The drilling tool according to claim 1 wherein said wedge member comprises a generally conical tip pointing away from said chuck end.

5. The drilling tool according to claim 1 wherein said bifurcated end extends generally conically outwards beyond a diameter of said chuck end.

6. The drilling tool according to claim 1 wherein said wedge member is bifurcated and formed with a bore, said bifurcated wedge member comprising two portions separated from each other by a gap, an abrasive annulus being formed at least partially around said bifurcated wedge member, wherein an additional wedge member is slidingly disposed in the bore of said first-mentioned wedge member, said additional wedge member being operative to push the two portions of said first-mentioned wedge member away from each other when pushed towards said chuck end.

7. The drilling tool according to claim 1 wherein said abrasive annulus is formed at a tip of said bifurcated end.

8. The drilling tool according to claim 1 wherein said abrasive annulus is constructed of a diamond coating.

\* \* \* \* \*